US008677502B2

(12) United States Patent
Hanson et al.

(10) Patent No.: US 8,677,502 B2
(45) Date of Patent: Mar. 18, 2014

(54) PROXIMITY BASED NETWORKED MEDIA FILE SHARING (75) Inventors: Eric Hanson, Emeryville, CA (US); Joshua David Fagans, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 717 days.

(21) Appl. No.: 12/710,268

(22) Filed: Feb. 22, 2010

(65) Prior Publication Data

US 2011/0209221 A1 Aug. 25, 2011

(51) Int. Cl.
*G06F 17/30* (2006.01)
*G06F 7/04* (2006.01)
*G06F 15/16* (2006.01)

(52) U.S. Cl.
USPC .............................. 726/26; 709/217; 709/227

(58) Field of Classification Search
None
See application file for complete search history.

(56) References Cited

U.S. PATENT DOCUMENTS

| | | | |
|---|---|---|---|
| 7,068,309 B2 | 6/2006 | Toyama et al. | |
| 7,508,799 B2* | 3/2009 | Sumner et al. | 370/338 |
| 7,599,685 B2 | 10/2009 | Goldberg et al. | |
| 7,792,756 B2* | 9/2010 | Plastina et al. | 705/51 |
| 2003/0093797 A1* | 5/2003 | Bazzaz | 725/74 |
| 2004/0101156 A1 | 5/2004 | Kacker | |
| 2007/0299681 A1* | 12/2007 | Plastina et al. | 705/1 |
| 2008/0065505 A1* | 3/2008 | Plastina et al. | 705/26 |
| 2008/0080774 A1 | 4/2008 | Jacobs et al. | |
| 2008/0158366 A1* | 7/2008 | Jung et al. | 348/207.1 |
| 2008/0209340 A1 | 8/2008 | Tonse et al. | |
| 2008/0212535 A1* | 9/2008 | Karaoguz et al. | 370/331 |
| 2008/0320560 A1* | 12/2008 | Casey et al. | 726/3 |
| 2010/0187832 A1* | 7/2010 | Holland et al. | 290/1 A |
| 2010/0191728 A1* | 7/2010 | Reilly et al. | 707/736 |
| 2011/0013569 A1* | 1/2011 | Scherzer et al. | 370/329 |
| 2011/0055891 A1* | 3/2011 | Rice | 726/2 |

* cited by examiner

*Primary Examiner* — Cordelia Zecher
*Assistant Examiner* — Trang Doan
(74) *Attorney, Agent, or Firm* — Fish & Richardson P.C.

(57) ABSTRACT

Among other things, methods, systems and computer program products are disclosed for manipulating media. In one aspect, one or more processes executing on a host computer system detect that a portable electronic device is within a predefined communications proximity relative to the host computer system, establish wireless communications and exchange information with the portable electronic device sufficient to determine that metadata relating to one or more items of visual media content reside on the portable electronic device. The metadata is used to retrieve the one or more items of visual media content from a storage location separate from the portable electronic device. The retrieved one or more items of visual media content are added to a list of visual media content available for presentation on a presentation device associated with the host computer system.

29 Claims, 5 Drawing Sheets

PROXIMITY BASED NETWORKED MEDIA FILE SHARING

BACKGROUND

This application relates to managing, sharing, and distributing, digital media files, including digital still image files and/or digital video image files. For example, media files can be imported from a media device (e.g., a digital camera or video recorder) into a computer system. Other imports can occur from computer to computer, such as copying a subset of media files from a user's folder of raw media files to a different folder. As another example, media files can be copied between a personal computer and a mobile device, such as a mobile phone, personal digital assistant (PDA), or personal gaming device.

Media files can be distributed among devices connected to a network. For example, a personal computer can send a request for a media file to a web server. The web server can provide the requested media file to the personal computer in response to the request. In some cases, media files can be shared between end user devices on a network. This type of media file sharing can be referred to as Peer-to-Peer sharing. For example, a user of a first computer can share digital still image files with a user of a second computer through a computer network.

SUMMARY

Methods, systems and computer program products are described for distributing media within a proximity based collective library. In one aspect, one or more processes executing on a host computer system detect that a portable electronic device is within a predefined communications proximity relative to the host computer system, establish wireless communications and exchange information with the portable electronic device sufficient to determine that metadata relating to one or more items of visual media content reside on the portable electronic device. The metadata is used to retrieve the one or more items of visual media content from a storage location separate from the portable electronic device. The retrieved one or more items of visual media content are added to a list of visual media content available for presentation on a presentation device associated with the host computer system.

Implementations can optionally include one or more of the following features. The visual media content may include digital still images, digital video, or a combination of both. Upon detecting that the portable electronic device has departed from the predefined communications proximity, and/or upon detecting that the portable electronic device has changed status, the computer host system may delete the retrieved one or more visual media content items. Establishing wireless communications may involve using Bonjour or another zero configuration network protocol. The metadata may include one or more of (i) privacy information indicating that a subset of the visual media content is unavailable for presentation, (ii) a low resolution version of a visual media content item that is available for display while the host computer system is retrieving a high resolution counterpart of the visual media item, (iii) security credentials needed to retrieve the visual media content, and (iv) information that specifies presentation parameters for the visual media content, for example, parameters including one or more of presentation format information and complementary media to be presented along with the retrieved visual media content.

In another aspect, a host computer system executing one or more processes may detect that a plurality of portable electronic device are within a predefined communications proximity relative to the host computer system, establish wireless communications with the portable electronic devices, exchange information with the portable electronics devices to determine that metadata relating to one or more items of visual media content resides on one or more of the portable electronic devices, and use the metadata in the one or more portable electronic devices to generate a collective library of visual media content currently available for presentation on a presentation device associated with the host computer system. The host computer system may further modify the collective library of visual media content upon detecting that one or more of the portable electronic devices has changed state.

In another aspect, a wireless communication hub and a computer system may be configured to collectively create and maintain a proximity defined media zone within which information on the predetermined topic is available for wireless receipt by one or more portable electronic devices. In that regard, a system may include a wireless communication hub configured to exchange information with one or more portable electronic devices, and a computer system executing one or more processes to perform operations including detecting that one or more portable electronic devices are within a predefined communications proximity relative to the wireless communication hub, establishing wireless communications with the one or portable electronic devices, transmitting information relating to a predetermined topic to the one or more portable electronic devices, and ceasing communication with a portable electronic device upon detecting that the portable electronic devices is no longer within the predefined communications proximity.

The subject matter described in this specification may provide one or more of the following potential advantages. Media files can be readily shared among devices within relative physical proximity to each other. A first computing device within relative physical proximity to a second computing device can provide access to media files that are stored on a computing device that is different than the first computing device. Additionally, the first computing device can provide access to media files having a large file size, where the first computing device may not have adequate memory space to store the media files locally. A collective, distributed library of media content can be created using metadata stored on computing devices within relative physical proximity to each other.

The subject matter described in this specification can be implemented as a method or as a system or using computer program products, tangibly embodied in computer readable medium, such as a CD-ROM, a DVD-ROM, a semiconductor memory, and a hard disk. Such computer program products may cause a data processing apparatus to conduct one or more operations described in this specification.

In addition, the subject matter described in this specification can be implemented as a system including a processor and a memory coupled to the processor. The memory may encode one or more programs that cause the processor to perform one or more of the method acts described in this specification. Further the subject matter described in this specification can be implemented using various data processing machines.

BRIEF DESCRIPTION OF THE DRAWINGS

Like reference symbols and designations in the various drawings indicate like elements.

DETAILED DESCRIPTION

Techniques, apparatus, systems and computer program products are described for creating a central media file library using media files indicated by computing devices located within relative proximity to each other. A host computer system can create the central media file library by detecting devices within a predefined communications proximity and identifying one or more media file locators stored on the devices. The media file locators can indicate one or more locations of media files stored on media file distribution systems. The host computer system can retrieve the media files stored at the indicated one or more locations and create a central media file library using the retrieved media files. The media files within the central media file library can be presented by a presentation device associated with the host computer system.

Figure 1:
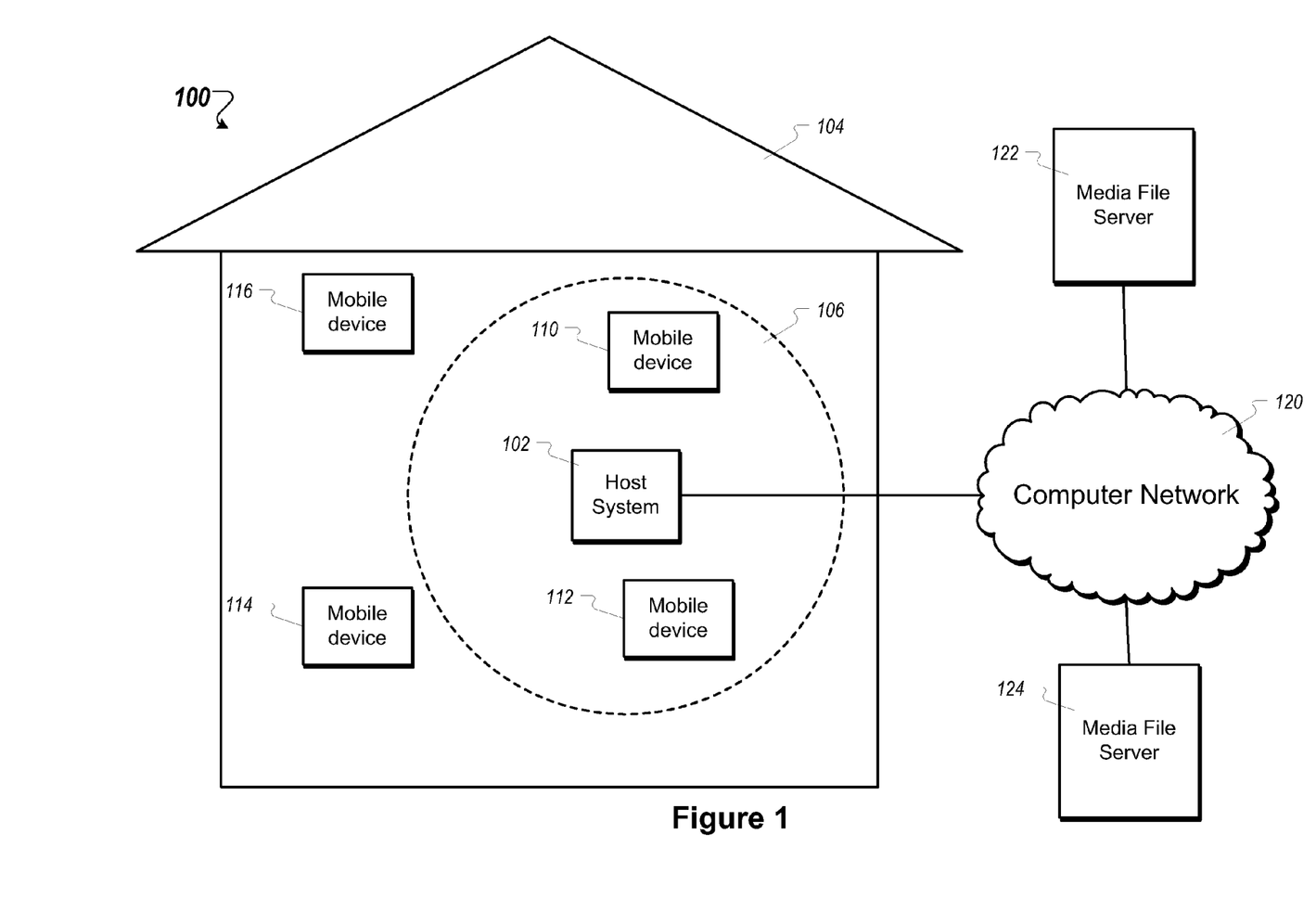
FIG. 1 shows an example system for networked media file sharing.

FIG. 1 shows an example system 100 for networked media file sharing. The system 100 includes a host system 102 located within a building 104 (e.g., a private residence, restaurant, office building, school, or business). The host system 102 can be, for example, a personal computer (e.g., desktop or laptop computer), a web enabled TV, a media server device (e.g., an Apple TV), a gaming console, or a network server. In some alternative implementations, the host system 102 can be a mobile device, such as, for example, a smart phone, a personal digital assistant (PDA), or a personal gaming device.

In some implementations, the host system 102 is configured to create a central media file library and present media files from the central media file library to one or more users. In some implementations, the media files can be digital still images (e.g., photos or pictures stored as jpeg, bitmap, gif, tiff, jfif, or png files), digital video files (e.g., mv4, mpeg, mov, divx, or wmv files), or a combination of both. In other implementations, the media files can additionally include audio files (e.g., mp3, wave, flac, aac, m4p, or wma files). In some implementations, the media files can include slide shows that include multiple digital still images or videos. In some implementations, a portion of the media files that make up the central media file library can be stored on the host system 102.

The host system 102 can be connected to a display device for presenting the media files to one or more users. For example, the host system 102 can be connected to a computer monitor or television. As another example, the host system 102 can include one or more built in monitors for displaying media files. In implementations in which the media files are digital still images, the host system 102 can be configured to display the digital still images as a slide show. In some implementations, the host system 102 can play audio while displaying the digital still images. In implementations in which audio is played along with digital still images, or in which the media files include video or audio files, the host system 102 can be connected to speakers for playing audio associated with the media files.

The host system 102 can be configured to detect other computing devices that are within relative proximity to the host system 102. In some implementations, the host system 102 can use a zero configuration networking protocol to detect other computing devices and automatically create an IP network without the need for manual operator intervention. For example, the host system 102 can use zero configuration network configuration software, such as Bonjour, to detect computing devices (e.g., printers, computers, mobile devices) within relative proximity to the host system 102 in order to create a local area network. In some implementations, the host system 102 can detect other devices, and services offered by those devices, using multicast Domain Name System service records.

In some implementations, the host system 102 can define an area in which to detect computing devices to be included in a local area network. For example, the host system 102 can define a media file zone 106 that represents all areas within a specified distance from the host system 102. The host system 102 can identify devices within the media file zone 106 in order to create a local area network. In some implementations, the media file zone 106 can be the maximum communication range for the host system 102. In some implementations, the host system 102 can define an area for the media file zone 106 that is smaller than the maximum communication range for the host system 102 (e.g., within 12 feet of the host system 102). For example, if the host system 102 is located within an apartment, a user of the host system 102 may want to configure the host system 102 to define the media file zone 106 to be within the apartment, so that devices located in adjacent apartments are not included in the network created by the host system 102. In some implementations, the host system 102 can determine if a mobile device is located within the media file zone 106 using signal strength of wireless communications between the host system 102 and the mobile device.

The host system 102 can identify devices located within the media file zone 106 in order to create a local area network as described above. For example, the host system 102 identifies a mobile device 110 and a mobile device 112 as being located within the media file zone 106 and initiates communications with the mobile devices 110 and 112 using a zero configuration network protocol. In some implementations, the communications are wireless communications (e.g., using Bluetooth or WiFi). The mobile devices 110 and 112 can be, for example, mobile phones, PDAs or personal gamming systems. In some alternative implementations, the functions of the mobile devices 110 and 112 can be performed by personal computers or other less mobile computing devices. For example, a desktop computer located within the media file zone 106 can perform functions similar to those described below with respect to the mobile devices 110 and 112.

In some implementations, additional devices, such as a mobile device 114 and a mobile device 116 can be located within the building 104 without being located within the media file zone 106. In some implementations, the mobile devices 114 and 116 are excluded from the local area network created by the host system 102 because they are outside of the media file zone 106.

In some implementations, the mobile devices 110 and 112 can share media files or metadata associated with media files with the host system 102. For example, the mobile device 110 can include a number of digital still image files that are available to be shared with the host system 102. The host system 102 can detect the digital still image files on the mobile device 110 and request that the mobile device 110 provide the digital still image files to the host system 102 for inclusion in the central media file library. The digital still image files can then be displayed as part of a slide show along with images stored on the host system 102 and images stored on other devices within the media file zone 106, such as the mobile device 112.

In some implementations, the mobile device 110 designates particular files as being publicly accessible. For example, a user of the mobile device 110 can edit metadata associated with digital still image files stored on the mobile device 110 to indicate that the digital still image files are publicly accessible. This allows the digital still image files to be accessible by other devices, such as the host system 102. As another example, the user can place certain media files into a shared folder in order to indicate that the media files contained within the shared folder are publicly accessible. This can allow the user of the mobile device 110 to keep a portion of the media files stored on the mobile device 110 private while designating other media files as publicly available media files.

In some implementations, the host system 102 can cause the mobile devices 110 and 112 to present prompts to users of the mobile devices 110 and 112 in order to request permission for access to media files or metadata associated with media files that is stored on the mobile devices 110 and 112. For example, the host system 102 can cause the mobile device 112 to display a prompt reading "Would you like to share media files?" The user of the mobile device 112 can select yes or no in order to allow or deny the host system 102 to access media files or metadata associated with media files stored on the mobile device 112. As another example, the mobile device 110 can receive a request for media files from the host system 102 and display a prompt of "Share media files?" in response to the request. The mobile device 110 can display options for the user of "Share all media files," "Share only public media files," "Share only image files," and "Do not share media files." The user of the mobile device 110 can select one of the displayed options in order to indicate which, if any, media files the host system 102 is allowed to access. In other implementations, the mobile devices 110 and 112 do not prompt the users when a request for media files is received. In such implementations, placing media files in a shared folder, or using metadata associated with media files to indicate that media files are publicly available can serve as implicit confirmation by the user.

In some implementations, media files can be designated with varying levels of privacy. For example, the mobile device 110 can allow the user of the mobile device 110 to edit metadata associated with media files to indicate privacy levels such as "public," "family," "friends," "business," and "private." In this example, when the mobile device 110 receives a request for media files, the mobile device 110 can allow the user of the mobile device 110 to indicate which privacy level to allow. In some implementations, the privacy levels can be arranged in a hierarchy. For example, a privacy designation of "public" can be hierarchically below privacy designations of "family" and "friends." In this example, if the user of the mobile device 110 indicates that media files designated with a "friends" privacy level are to be shared, the mobile device 110 can make all media files with a "friends" designation as well as all media files with a "public" designation available to a system requesting media files.

In some alternative embodiments, the mobile devices 110 and 112 can allow media files to be designated with varying levels of privacy by being placed in different shared folders. For example, the mobile device 112 can allow the user of the mobile device 112 to place media files into folders labeled "public," "private," "family," and "friends." In some instances, the mobile device 112 can additionally allow the user to create additional folders and place media files into these additional folders. Upon receiving a request for media files, the mobile device 112 can prompt the user of the mobile device 112 to indicate which folders, if any, are to be shared.

In practice, in some implementations, the host system 102 identifies the mobile devices 110 and 112 as being located within the media file zone 106. The host system 102 initiates communication with the mobile devices 110 and 112 and requests media files for inclusion in the central media file library. In some implementations, the mobile devices 110 and 112 display prompts to the users of the mobile devices 110 and 112 as described above to allow the users to give permission for some or all of the media files stored on the mobile devices 110 and 112 to be shared. Media files can then be provided to the host system 102 by the mobile devices 110 and 112. For example, if the user of the mobile device 110 indicates that media files stored in a "friends" folder are to be provided, the mobile device 110 provides the media files stored in the "friends" folder to the host system 102.

The host system 102 creates the central media file library using the media files received from the mobile devices 110 and 112. In some implementations, the host system 102 can additionally include media files stored on the host system 102 or stored on other devices in the central media file library. The host system 102 can then present media files from the central media file library to users located in the building 104. For example, if the central media file library is a photo library made up of photos collected from the mobile devices 110 and 112, the host system 102 can create slide show using the photos and display the slide show using a TV, monitor, or other display device connected to the host system 102. In some instances the host system 102 can play music while displaying the slide show. In some cases, the music played along with the slide show can include media files obtained from the mobile devices 110 and 112.

As another example, if the central media file library is a video library made up of video files collected from the mobile devices 110 and 112, the host system 102 can display the videos in a predetermined or random sequence using a TV, monitor, or other display device connected to the host system 102. As yet another example, the central media file library can include digital still image files and digital video files. The host system 102 can play videos from the central media file library and display digital still image files from the central media file library in-between the videos using a TV, monitor, or other display device connected to the host system 102.

In some implementations, rather than, or in addition to, providing media files to the host system 102, the mobile devices 110 and 112 can provide metadata that indicates storage locations of one or more media files to the host system 102. For example, if the host system 102 is connected to a large screen high-definition TV for presentation of media files, it can be desirable to display high-resolution or high-definition media files on the TV in order to create a more pleasurable viewing experience for users viewing the TV than if low resolution or low definition media files were displayed. In this example, the mobile device 110 may not include enough memory storage space to store a significant quantity of high-resolution or high-definition media files. In such instances, rather than high-resolution or high-definition media files being stored directly on the mobile device 110, pointers to network locations for high-resolution or high-definition media files can be stored on the mobile device 110.

These pointers can take the form of media file locator files that indicate a network location of a media file.

For example, the mobile device 110 can store a photo locator file for indicating the location of a high-resolution photograph. In response to a request for images received from the host system 102, the mobile device 110 can provide the photo locator file to the host system 102. The host system 102 can then use the photo locator file to identify a network location of the high-resolution photograph.

As another example, the mobile device 110 can store URLs for high-definition video files and high-resolution digital still image files. Upon receiving a request for media files from the host system 102, and optionally receiving input indicating an allowed privacy level from the user of the mobile device 110, the mobile device 110 can provide the URLs associated with the high-definition video files and high-resolution digital still image files to the host system 102. The host system 102 can use the URLs to access the high-definition video files and high-resolution digital still image files. For example, the host system 102 can be connected to a computer network 120 (e.g., the Internet, a LAN, or a WAN). A URL provided by the mobile device 110 can direct the host system 102 to a high-resolution digital still image file stored on a media file server 122. The host system 102 can send a request for the file to the media file server 122. The media file server 122 can then provide the requested file to the host system 102 through the computer network 120. The requested file can then be included in the central media file library and displayed using a TV, monitor, or other display device connected to the host system 102.

Privacy levels for media file locator files can be indicated as described above for media files. For example, media file locator files stored on the mobile device 110 can be placed into a shared folder to indicate that the media file locator files can be accessed by other devices (e.g., the host system 102). As another example, the metadata associated with a media file locator file can be edited to indicate that the media file locator file has a privacy designation of "friends."

In some implementations, a single media file locator file or pointer provided by the mobile devices 110 and 112 can direct the host system 102 to multiple media files. For example, the mobile device 110 can provide a pointer to the host system 102 that indicates a location of a collection of digital still image files that are intended to be displayed together as a slide show. As another example, the mobile device 112 can provide a media file locator file to the host system 102 that indicates a collection of digital video, audio, and still image files that can be included in the central media file library.

In some implementations, the mobile devices 110 and 112 can provide security credentials along with pointers to high-resolution or high-definition media files to the host system 102. For example, the mobile device 112 can provide the host system 102 with a network address (e.g., a URL, IP address, or folder location) for a high-definition video file stored on a media file server 124. The media file server 124 can require that security credentials (e.g., a password, network key, or session key) be provided before granting access to files stored on the media file server 124. The mobile device 112 can provide the required security credentials to the host system 102 along with the network address for the high-definition video file.

The host system 102 can use the network address provided by the mobile device 112 to send a request for the high-definition video file to the media file server 124. The host system 102 can include the provided security credentials along with the request. The media file server 124 can confirm the authenticity of the security credentials provided by the host system 102 and provide the requested high-definition video file to the host system 102. In this example, if the security credentials provided by the host system 102 are not the correct security credentials, the media file server 124 can deny access to the requested file. In some implementations, the provided security credentials can be one time use security credentials.

In some implementations, the mobile devices 110 and 112 can provide both media files, and pointers to network locations of media files in response to a request for media files received from the host system 102. For example, the mobile device 112 can have a number of high-resolution digital still image files stored on a local memory as well as metadata associated with high-definition video files stored on the local memory. The mobile device 112 can provide the high-resolution digital still image files to the host system 102 and provide pointers to network locations for the high-definition video files to the host system 102.

In some implementations, the mobile devices 110 and 112 provide additional information to the host system 102 along with media files or pointers to network locations of media files. Additional information provided by the mobile devices 110 and 112 can take the form of metadata associated with the media files. The additional information can include lower resolution or lower quality media files, presentation information, rating information, captions, image name, image size, date captured, or location captured. For example, the mobile device 110 can provide a photo locator file to the host system 102 that indicates the location of a high-resolution photograph. The mobile device 110 can additionally provide a thumbnail version of the photograph, or a low-resolution version of the photograph along with the photo locator file. The thumbnail or low resolution version of the photograph can be displayed as part of the central media file library until the host system 102 is able to obtain the high-resolution photograph. In some instances, the host system 102 may be unable to reach a network location of the high-resolution photograph (e.g., due to a network or server outage). In such instances, the host system 102 can use the thumbnail or low-resolution version of the photograph in the central media file library in place of the high-resolution photograph In some implementations, the mobile devices 110 and 112 can provide presentation information along with a pointer to a media file. For example, the mobile device 112 can indicate an order in which to display images or other media files. As another example, the mobile device 112 can provide audio files to be played along with a slide show or collection of digital still image files. As yet another example, the mobile device 112 can indicate transitions to use between digital still images (e.g., fade, star wipe, etc.). Additional presentation information can include how to display a media file on different types of displays (e.g., wide screen vs. standard TV).

In some implementations, the mobile devices 110 and 112 rating information for a media file. For example, a user of the mobile device 110 can rate a video file on a scale of 1 to 10. The rating can be transmitted to the host system 102 along with a pointer to a network location of the video file. The host system 102 can use the rating information to determine when to present the video file in relation to other media files or how often to present the video file in relation to other media files. In some implementations, the mobile devices 110 and 112 can additionally supply captions or other text associated with media files. The host system 102 can display the captions or text when displaying the media files. In some implementations, other users of the local area network created by the host system 102 can enter rating information or captions for a media file. For example, the host system 102 can receive a link to a network location of an image file from the mobile device 110, retrieve the image file, and display the image using a TV, monitor, or other display device connected to the host system 102. A user of the mobile device 112 can use the mobile device 112 to rate the image file, or provide a caption for the image file. This information can then be provided to the host system 102 and used as described above. In some implementations, the rating or caption information provided by the mobile device 112 can be provided to the mobile device 110 by the host system 102. The mobile device 110 can then associate the rating or caption information with the image file, either in metadata stored on the mobile device 110 or stored at the network location of the image file.

In some implementations, the mobile devices 110 and 112 can provide a date or time of when a media file was capture or created or a location of where a media file was captured or created. For example, the mobile device 110 can provide a time stamp that indicates a date and time when a digital still image file was captured to the host system 102 along with a link to a network location of the digital still image file. The host system 102 can display the date and time information along with the digital still image file. As another example, the mobile device 110 can provide a location (e.g., city, state, and country, or latitude and longitude) along with a link to a network location of a media file. The host system 102 can display the location information along with the media file. For example, the host system 102 can display a city and state where a video was filmed. As another example, the host system 102 can display a small map in a corner of a display indicating where a photograph was taken.

In some implementations, the content of the central media file library will change as devices move in or out of the media file zone 106 or as devices become available or unavailable. For example, a user of the mobile device 116 can be carrying the mobile device 116 in her pocket. The user can enter the media file zone 106 which can cause the host system 102 to detect that the mobile device 116 has entered the media file zone 106 and is available to provide content for the central media file library. The host system 102 can initiate communications with the mobile device 116 and request media files for inclusion in the central media file library as described above with respect to the mobile devices 110 and 112. The host system 102 can receive media files, media file locator files, or a combination of both from the mobile device 116. The host system 102 can use the received media files, or media files located using the provided media file locator files as part of the central media file library. The media files can then be displayed using a TV, monitor, or other display device connected to the host system 102.

As another example, the user of the mobile device 110 may decide to leave the building 104 and head home. This causes the mobile device 110 to leave the media file zone 106. In some implementations, the host system 102 can identify that the mobile device 110 is no longer within the media file zone 106. In some cases, when the host system 102 determines that the mobile device 110 is no longer within the media file zone 106, the host system 102 can remove media files provided by the mobile device 110, or retrieved using metadata provided by the mobile device 110 from the central media file library. This can cause the media file to no longer be displayed as part of the central media file library.

Similarly, if the mobile device 112 becomes unavailable (e.g., is turned off or loses battery power) the host system 102 can identify that the mobile device 112 is no longer available and remove media files provided by the mobile device 112, or retrieved using metadata provided by the mobile device 112 from the central media file library. In some implementations, the host system 102 implements periodic polling in order to determine if mobile devices that had previously provided access to media files are still available and located within the media file zone 106. In some implementations, when a mobile device leaves the media file zone 106 or becomes unavailable, the host system 102 can permanently delete media files provided by the mobile device or retrieved using meta data provided by the mobile device from the central media file library. In some implementations, the host system 102 can disable media files that have been provided by the mobile device or retrieved using meta data provided by the mobile device without deleting the media files. The host system 102 can then enable the media files if the mobile device becomes available again.

For example, if a user of the mobile device 112 steps outside for a few minutes, this can cause the mobile device 112 to temporarily be located outside of the media file zone 106. If the user returns a while later, the host system 102 can enable the media files provided by the mobile device or retrieved using meta data provided by the mobile device rather than having to retrieve all of the media files again.

In some implementations, media files associated with a mobile device are permanently deleted if the mobile device is unavailable for a predetermined length of time. For example, media files associated with the mobile device 112 can be deleted from the central media file library if the mobile device 112 is unavailable for a half hour or longer. In some implementations, only files with certain privacy designations are deleted, while other files are retained in the central media file library. For example, media files designated as "public" can be permanently kept in the central media file library, while media files designated as "family" are deleted when an associated mobile device becomes unavailable.

Alternatively, or in addition, any deletion rules that the host system 102 is required to (or otherwise supposed to) honor could be dictated by the mobile device at the time the information is first exchanged. That is, the mobile device may have preference settings that tell a nearby host to delete anything received if device is out of range for greater than 30 minutes, or, alternatively, to go ahead and keep the files indefinitely. These rules/restrictions could be applied to the particular groups of media being shared (e.g., "family" files may have more strict deletion rules than "public" files).

In addition, at least some of the implementations described here assume a certain amount of trust here that the host system is not posing as a certified sharing service (i.e., assurance that privacy and deletion rules will be upheld). If an implementation is desired that need not rely on such a relatively high level of trust, then the mobile device could include functionality to request, view and/or confirm an appropriate trust certificate from the host service before deciding whether or not to engage in the media file sharing. Optionally, a mobile device may want to limit its interaction to a predetermined set of "known hosts". (e.g., the user's home server, a friend's home server) and to be excluded automatically from any public server (e.g., such as might be available in a coffee shop or the like).

In some implementations, the central media file library can be updated upon detecting that the state of a mobile device has changed. For example, a user of the mobile device 110 can initially opt to share media files with the host system 102 for inclusion in the central media file library. The user can later decide to remove media files from the central media file library by indicating that he would like to opt out of the central media file library. Media files associated with the mobile device 110 can then be removed from the central media file library.

In some implementations, the mobile devices 110 and 112 can include specialized software to enable the mobile devices 110 and 112 to communicate with the host system 102 and share media files and media file locator files with the host system 102. For example, the mobile device 112 can include a photo sharing mobile application to facilitate the sharing of photos (stored on the mobile device 112, at a network location, or both) with the host system 102. As another example, the mobile device 110 can include media sharing software to facilitate the sharing of media files with the host system 102.

In some implementations, media files can be shared in both directions between the host system 102 and the mobile devices 110 and 112. For example, the host system 102 can provide media files stored on the host system 102 or provided by the mobile device 112 to the mobile device 110. The user of the mobile device 110 can then access the media files using the mobile device 110. This can allow the user of the mobile device 110 to view media files that are different than media files presented by the host system 102 using a TV, monitor, or other display device connected to the host system 102.

In some implementations, the host system 102 can be a media file hotspot (or, equivalently, a "media zone") located in a place of business or other public area. For example, a host system 102 can be located in a zoo that includes multiple host systems, with each host system having its own associated media zone. For example, a host system 102 can be located near a gorilla exhibit. Upon entering the media zone 106, the mobile device 110 can receive media files from the host system 102 that include information about the gorillas, such as videos of the gorillas, pictures of the gorillas, and information about the gorilla's lifestyle and habitat. The user of the mobile device 110 can then move to a different media zone associated with a second host system located near a tiger exhibit. Upon detecting the mobile device 110, the second host system can provide media files containing information about tigers to the mobile device 110.

As another example, the host system 102 can be located in a restaurant to thus establish a media zone that is specific to that restaurant. Upon entering the restaurant's media zone 106, the mobile device 112 can receive information associated with the restaurant such as images of suggested menu items from the host system 102 and/or discount coupons. As another example, the host system 102 can be located in a clothing store and can act as a media zone, for example, to provide information on sales promotions to mobile devices that enter the store's media file zone.

In the media zone example described above, the respective functional roles of the host system 102 and the mobile device 112 can, in one sense, be thought of as being reversed. That is, in such media zones implementations, the mobile device 112 is effectively acting as the host or central node in that it receives information from one or more external sources (e.g., multiple host systems, each corresponding to a disparate associated media zone) and presents the received information to an end user (e.g., the owner of the mobile device 112), while each of the multiple host systems effectively is acting as a specialized, stationary node that provides information specific to a predetermined topics and which is limited to an associated spatial region.

Figure 2:
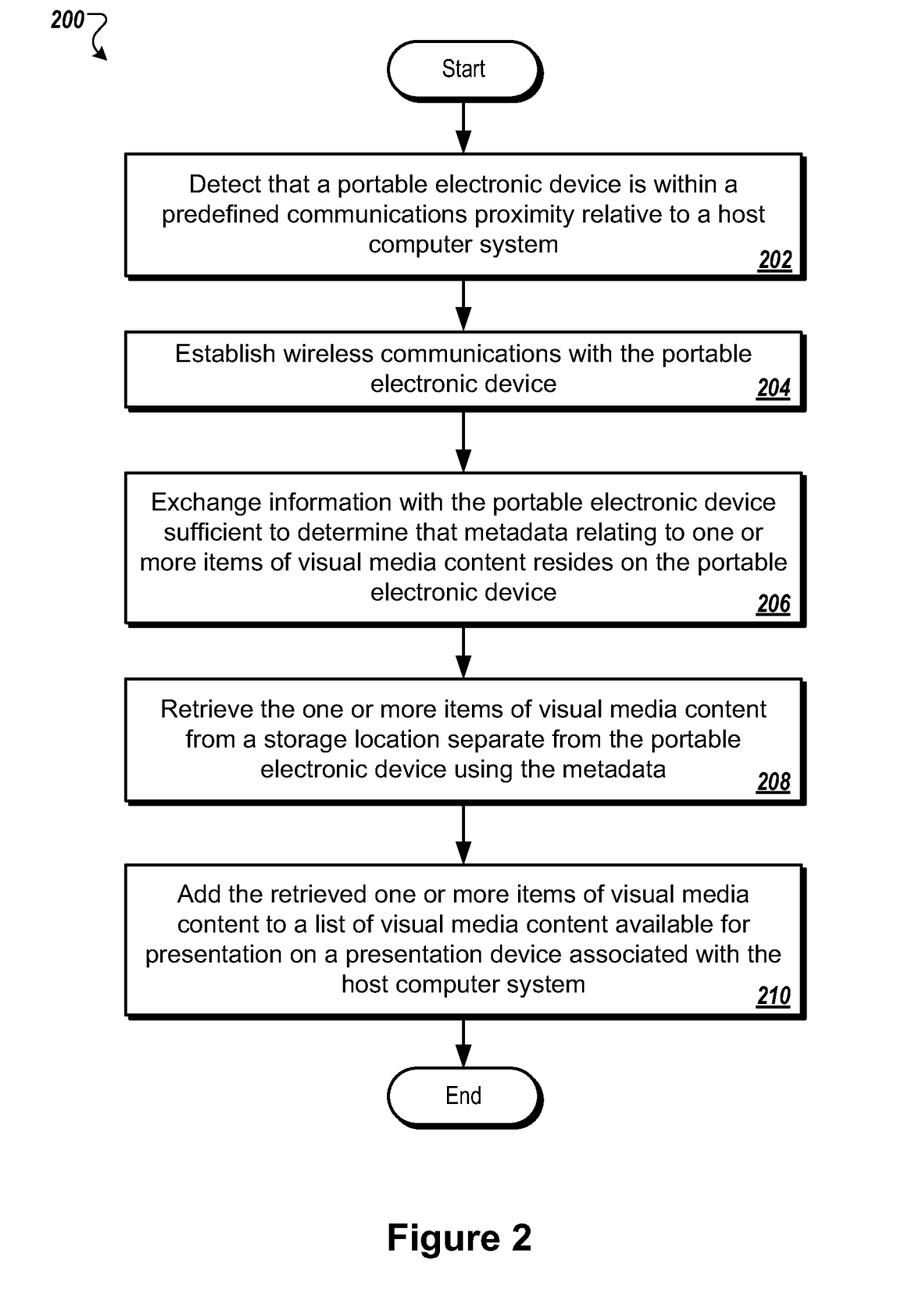
FIG. 2 is a flow diagram of an example process for retrieving visual media content for inclusion in a collection of available visual media content.

FIG. 2 is a process flow diagram showing an example process 200 for retrieving visual media content for inclusion in a collection of available visual media content. A system or apparatus can detect that a portable electronic device is within a predefined communications proximity relative to a host computer system (202). For example, a central media server (e.g., the host system 102 of FIG. 1) can use a zero configuration wireless networking protocol or software (e.g., Bonjour) to determine if any portable electronic devices (e.g., the mobile devices 110 and 112 of FIG. 1) are within a predefined communications proximity of the central media server. In some implementations, the predefined communications proximity can be the maximum communications range for the central media server. In other implementations, the central media server can define a predefined communications proximity that is less than the maximum communications range for the central media server. In some implementations, the central media server can measure the signal strength of wireless communications with the portable electronic device to determine that the portable electronic device is within the predefined communications proximity. The host computer system can be, for example, a personal computer (e.g., desktop or laptop computer), a web enabled TV, a media server device (e.g., an Apple TV), a gaming console, or a network server. In some implementations, the host computer system can alternatively be a mobile device, such as a mobile phone, PDA, or personal gaming device.

Wireless communications with the portable electronic device can be established (204). For example, the host computer system can establish a network connection with the portable electronic device using zero configuration networking software or by implementing a zero configuration networking protocol. In some implementations, the host computer system can use a network configuration protocol that requires some manual configuration.

Information can be exchanged with the portable electronic device sufficient to determine that metadata relating to one or more items of visual media content resides on the portable electronic device (206). For example, the portable electronic device (e.g. the mobile device 110 of FIG. 1) can include media file sharing software to facilitate the sharing of media files. The mobile device 110 can include a memory for storing metadata associated with media files that are stored at one or more network locations, separate from the portable electronic device. The metadata can indicate locations of one or more media files. For example, the metadata can indicate URLs for video files stored on a remote server. The metadata relating to one or more items of visual media content can additionally include lower resolution or lower quality media files, security credential information, presentation information, rating information, captions, image name, image size, date captured, or location captured information associated with the one or more items of visual media content.

The one or more items of visual media content can be retrieved from a storage location separate from the portable electronic device using the metadata (208). For example, the metadata can indicate a URL of a digital still image file. The host computer system can use the URL to access a network server and retrieve the digital still image file. In some implementations, the metadata can indicate security credential information (e.g., a password, private key, or session key). The security credential information can be provided to the network server in order to gain access to the digital still image file.

The retrieved one or more items of visual media content can be added to a list of visual media content available for presentation on a presentation device associated with the host computer system (210). For example, the retrieved one or more items of visual media content can be added to a central media file library of media files that are available for presentation to users of the host computer system, as described above with reference to FIG. 1. The host computer system (e.g., the host system 102 of FIG. 1) can be connected to a TV, computer monitor, or other display device or include a built in display screen for presenting the received visual media content. Following the above example, media files retrieved from the network server can be included in a central media file library created by the host computer system and displayed on the TV, computer monitor, or other display device. In some implementations, the visual media content is presented to users of the host computer system. For example, the host computer system can display a slide show of digital still image files using a TV, monitor, or other display device. As another example, the host computer system can display video files using a TV, monitor, or other display device.

Figure 3:
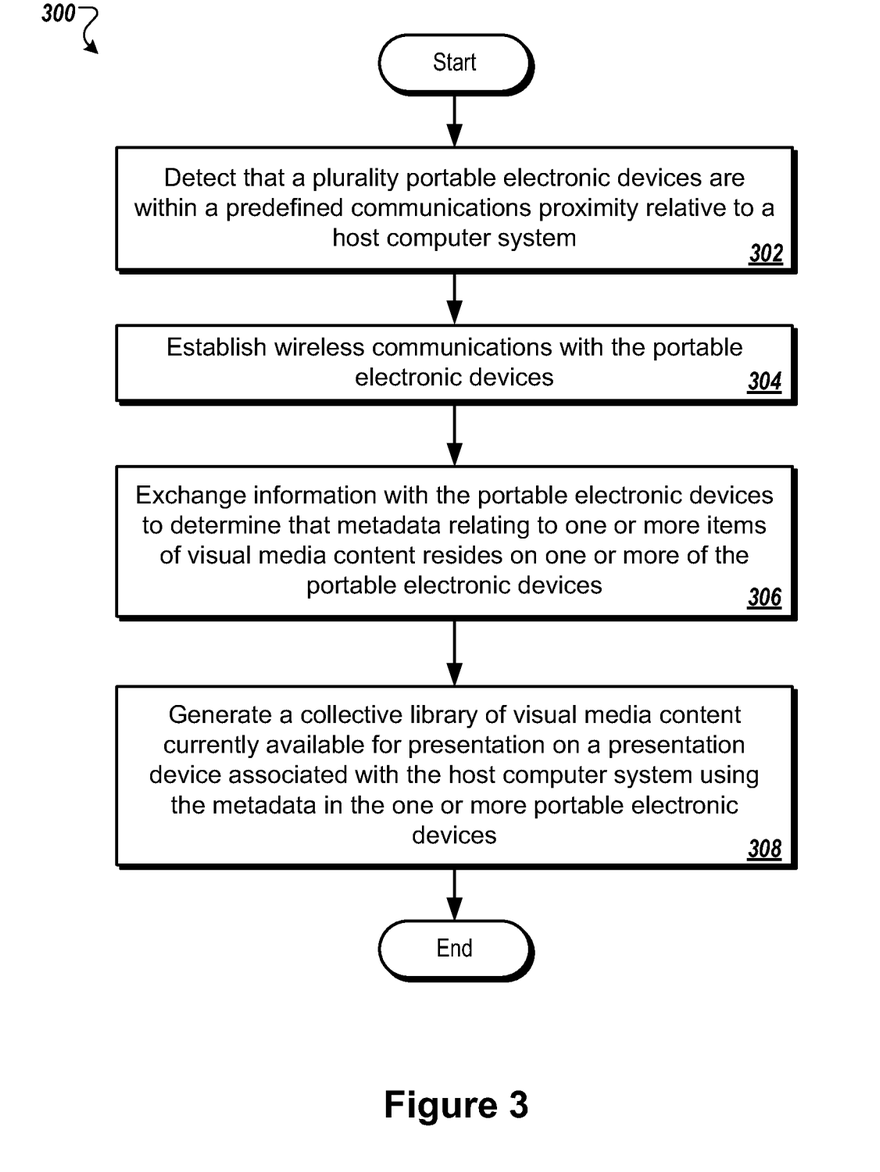
FIG. 3 is a flow diagram of an example process for generating a collective library of visual media content.

FIG. 3 is a process flow diagram showing an example process 300 for generating a collective library of visual media content. A system or apparatus can detect that a plurality of portable electronic devices are within a predefined communications proximity relative to a host computer system (302). For example, the host computer system (e.g., the host system 102 of FIG. 1) can use a zero configuration wireless networking protocol or software (e.g., Bonjour) to determine if any portable electronic devices (e.g., the mobile devices 110 and 112 of FIG. 1) are within a predefined communications proximity of the host computer system. In some implementations, the predefined communications proximity can be the maximum communications range for the host computer system. In other implementations, the host computer system can define a predefined communications proximity that is less than the maximum communications range for the host computer system. In some implementations, the host computer system can measure the signal strength of wireless communications with the plurality of portable electronic devices to determine that the portable electronic devices are within the predefined communications proximity. The host computer system can be, for example, a personal computer (e.g., desktop or laptop computer), a web enabled TV, a media server device (e.g., an Apple TV), a gaming console, or a network server. In some implementations, the host computer system can alternatively be a mobile device, such as a mobile phone, PDA, or personal gaming device.

Wireless communications with the portable electronic devices can be established (304). For example, the host computer system can establish network connections with the portable electronic devices using zero configuration networking software or by implementing a zero configuration networking protocol. In some implementations, the host computer system can use a network configuration protocol that requires some manual configuration.

Information can be exchanged with the portable electronic devices to determine that metadata relating to one or more items of visual media content resides on one or more of the portable electronic devices (306). For example, the portable electronic devices (e.g. the mobile devices 110 and 112 of FIG. 1) can include media file sharing software to facilitate the sharing of media files. The portable electronic devices can include memory systems for storing metadata associated with media files that are stored at one or more network locations, separate from the portable electronic devices. The metadata can indicate locations of one or more media files. For example, the metadata can indicate URLs for video files stored on a remote server. The metadata relating to one or more items of visual media content can additionally include lower resolution or lower quality media files, security credential information, presentation information, rating information, captions, image name, image size, date captured, or location captured information associated with the one or more items of visual media content.

A collective library of visual media content currently available for presentation on a presentation device associated with the host computer system can be generated using the metadata in the one or more portable electronic devices (308). In some implementations, the metadata can be used to identify network locations for items of visual media content that are stored remotely from the portable electronic devices. For example, one portable electronic devices can provide a URL for a digital video file to the host computer system. The host computer system can use the URL to access the digital video file on a remote server. The digital video file can be retrieved from the remote server and added the collective library of visual media content. As another example, some of the plurality of portable electronic devices can provide digital still image files to the host computer system. The host computer system can add the received digital still image files to the collective library of visual media content.

The items of visual media content that make up the collective library of visual media content can be presented by the host computer system using a display device associated with host computer system, such as a TV, computer monitor, built in display screen. The presentation of the items of visual media content can be informed by the metadata. For example, the metadata can include instructions on how to display particular items of visual media content or transitions to use between presentation of different items of visual media content. As another example, the metadata can indicate audio to be played along with a slide show of digital still images contained in the collective library of visual media content.

Figure 4:
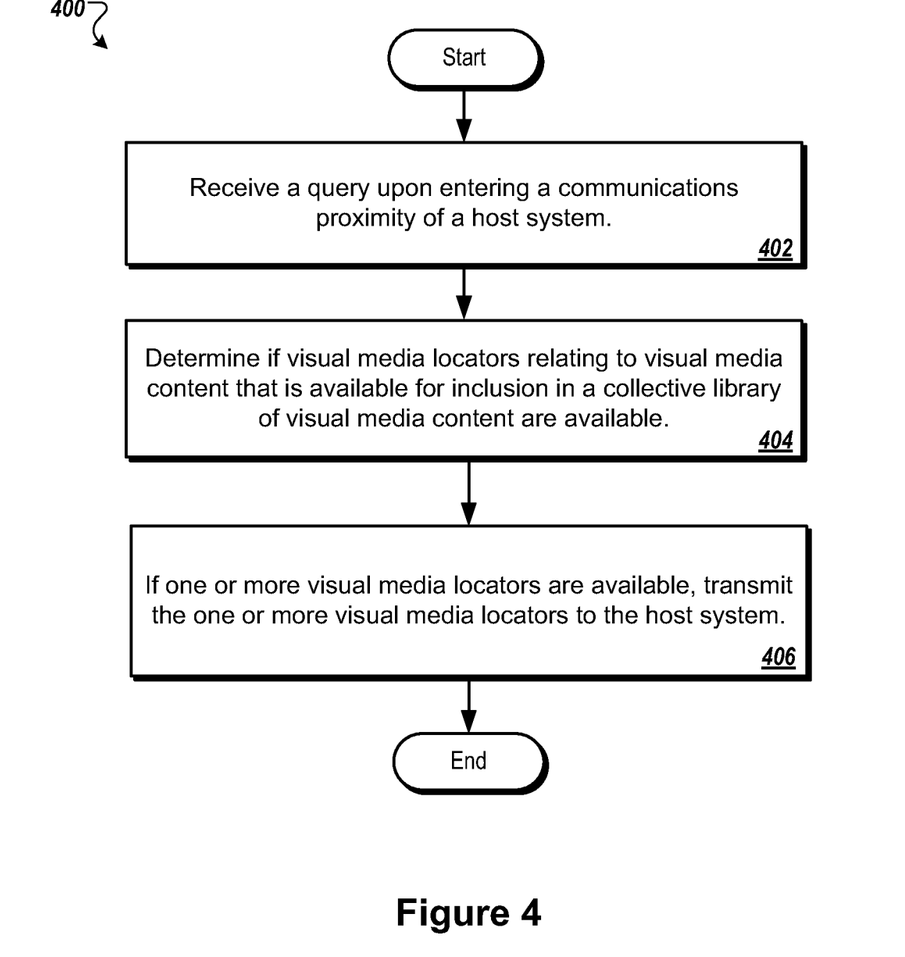
FIG. 4 is a flow diagram of an example process for providing visual media locators to a host system.

FIG. 4 is a process flow diagram showing an example process 400 for providing visual media locators to a host system. In some implementations, the process 400 can be performed by, for example, the mobile devices 110 and 112 of FIG. 1. A system or apparatus can receive a query upon entering a communications proximity of a host system (402). For example, a portable electronic device (e.g., the mobile device 110 of FIG. 1) can come within a predefined distance of the host system (e.g., the media file zone 106 of FIG. 1). The host system can detect the presence of the portable electronic device within the communications proximity and send a request for visual media content to the portable electronic device. The portable electronic device can receive the request from the host system. In some implementations, the portable electronic device includes media sharing software that can be used to interpret the query received from the host system and facilitate the sharing of media content.

The system or apparatus can determine if visual media locators relating to visual media content that is available for inclusion in a collective library of visual media content are available (404). The visual media locators can be files that indicate a network location for a stored visual media file. For example, the visual media locators can provide URLs or IP addresses for high-resolution digital still image files or high-definition video Files.

Following the above example, the portable electronic device can determine if visual media locators are stored in a memory of the portable electronic device. In some implementations, if visual media locators are identified, the portable electronic device can determine if the visual media locators are available to be provided to the host system. This can include identifying privacy level information for the visual media locators and determining if the host system is allowed to access visual media locators having the identified privacy levels. Privacy levels can be indicated using metadata, or by placing visual media locators into directories having specified privacy levels.

In some implementations, the portable electronic device can provide a prompt to a user to determine if access is to be granted for one or more visual media locators. In some implementations, the prompt can be a simple allow or not allow prompt. In other implementations, the portable electronic device can allow the user to indicate which privacy level to grant the host system. In some cases, if the host system is granted a particular privacy level, the host system can access all visual media locators having that privacy level or a lower ranked privacy level.

If it is determined that one or more visual media locators are available, the one or more visual media locators are transmitted to the host system (406). For example, if the user of the portable electronic device indicates that a collection of visual media locators are to be shared with the host system, the visual media locators are transmitted to the host system. As another example, the user may have preset an indication to share all visual media locators that are available on the portable electronic device. The portable device can transmit all identified visual media locators to the host system in response to the query received from the host system.

In some implementations, the host system can use the visual media locators to retrieve visual media files from a remote network location. In some implementations, the portable electronic device can also provide security credential information along with the provided visual media locators. The security credential information can be used by the host system to access protected visual media files located at remote network locations. In some implementations, the portable electronic device can provide additional metadata associated with the visual media files along with the visual media locators. This additional metadata can include lower resolution or lower quality visual media files, security credential information, presentation information, rating information, captions, image name, image size, date captured, or location captured information associated with the visual media files.

In some implementations, the user may not grant access to the visual media locators. In such implementations, the portable electronic device can indicate to the host system that no visual media locators are available for inclusion in the collective library of visual media content.

Figure 5:
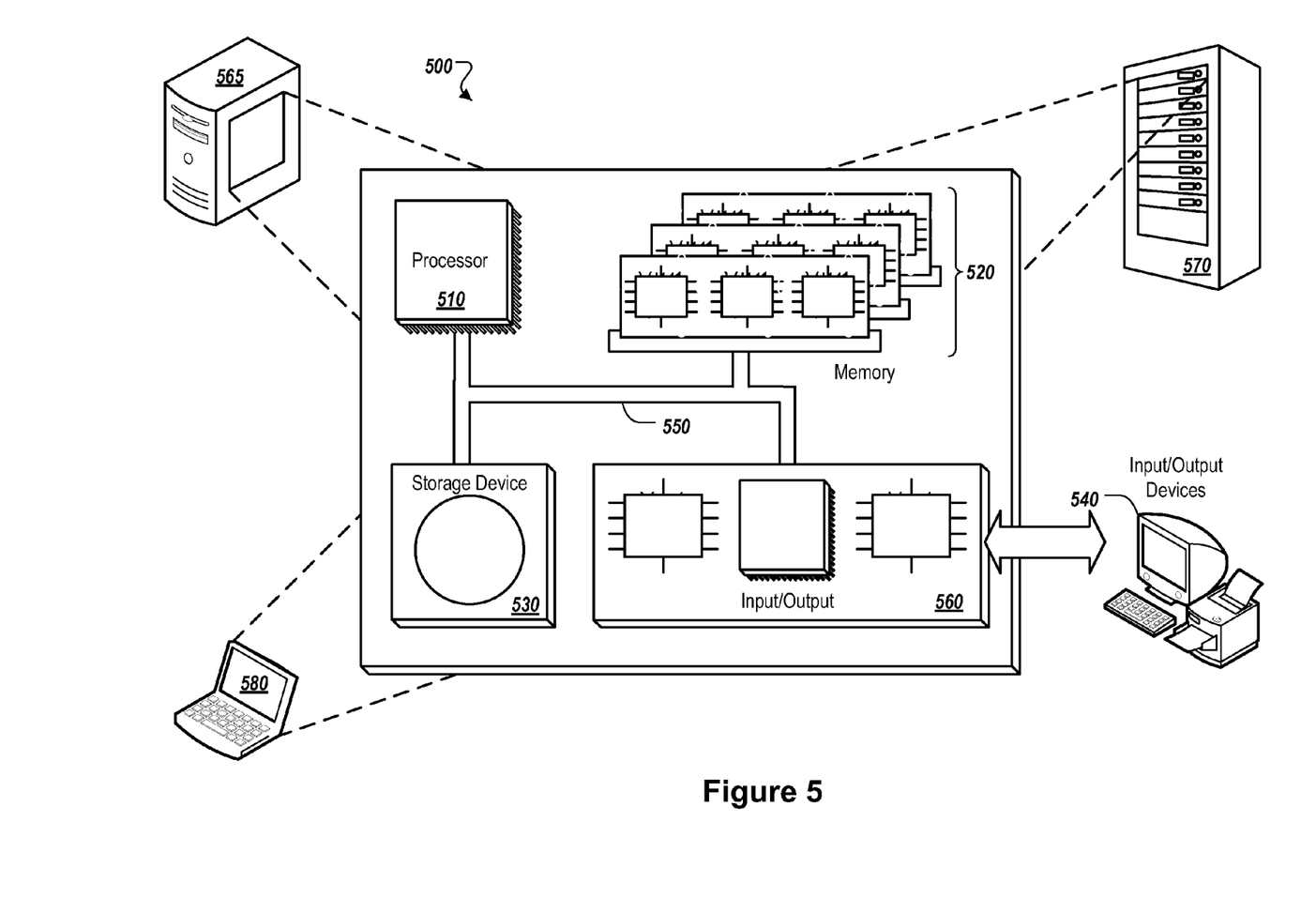
FIG. 5 is a block diagram of a computing device and system that can be used in connection with computer-implemented methods and systems described in this document.

FIG. 5 is a block diagram of a computing device and system that can be used, e.g., to create a central media file library. Computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 500 includes a processor 510, memory 520, a storage device 530, a high-speed interface 550 connecting to memory 520. The computing device can also include high-speed expansion ports (not shown), and a low speed interface (not shown) connecting to low speed bus (not shown) and storage device 530. Each of the components 510, 520, 530, 550, and 520, are interconnected using various busses, and can be mounted on a common motherboard or in other manners as appropriate. The processor 510 can process instructions for execution within the computing device 500, including instructions stored in the memory 520 or on the storage device 530 to display graphical information for a GUI on an external input/output device, such as display 540 coupled to an input/output interface 560. In other implementations, multiple processors and/or multiple buses can be used, as appropriate, along with multiple memories and types of memory. Also, multiple computing devices 500 can be connected, with each device providing portions of the necessary operations (e.g., as a server bank, a group of blade servers, or a multi-processor system).

The memory 520 stores information within the computing device 500. In one implementation, the memory 520 is a computer-readable medium. In one implementation, the memory 520 is a volatile memory unit or units. In another implementation, the memory 520 is a non-volatile memory unit or units.

The storage device 530 is capable of providing mass storage for the computing device 500. In one implementation, the storage device 530 is a computer-readable medium. In various different implementations, the storage device 530 can be a floppy disk device, a hard disk device, an optical disk device, or a tape device, a flash memory or other similar solid state memory device, or an array of devices, including devices in a storage area network or other configurations. The computer program product contains instructions that, when executed, perform one or more methods, such as those described above. The computer- or machine-readable medium can include the memory 520, the storage device 530, or memory on processor 510.

The high speed controller 550 manages bandwidth-intensive operations for the computing device 500, while the low speed controller manages lower bandwidth-intensive operations. Such allocation of duties is exemplary only. In one implementation, the high-speed controller 550 is coupled to memory 520, display 540 (e.g., through a graphics processor or accelerator), and to high-speed expansion ports (not shown), which can accept various expansion cards (not shown). In the implementation, low-speed controller (not shown) is coupled to storage device 530 and low-speed expansion port (not shown). The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 500 can be implemented in a number of different forms, as shown in the figure. For example, it can be implemented as a standard server 565, or multiple times in a group of such servers. It can also be implemented as part of a rack server system 570. In addition, it can be implemented in a personal computer such as a laptop computer 580.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible computer or machine readable medium for execution by, or to control the operation of, data processing apparatus. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application. A number of embodiments have been described. Nevertheless, it will be understood that various modifications are optionally made without departing from the spirit and scope of this disclosure. Accordingly, other embodiments are within the scope of the following claims.

What is claimed is:

1. A method performed by one or more processes executing on a host computer system, the method comprising:
   detecting that a portable electronic device is within a predefined communications proximity relative to the host computer system;
   establishing wireless communications with the portable electronic device;
   receiving metadata from the portable electronic device, wherein the metadata relates to one or more items of visual media content that reside on the portable electronic device, and wherein the metadata includes a low resolution version of a visual media content item that is available for display while the host computer system is retrieving a high resolution counterpart of the visual media item;
   using the metadata to retrieve the one or more items of visual media content from a storage location separate from the portable electronic device; and adding the retrieved one or more items of visual media content to a list of visual media content available for presentation on a presentation device associated with the host computer system.

2. The method of claim 1, wherein the visual media content comprises digital still images, digital video, or a combination of both.

3. The method of claim 1, further comprising deleting the retrieved one or more visual media content items upon detecting that the portable electronic device has departed from the predefined communications proximity.

4. The method of claim 1, wherein establishing wireless communications comprises using Bonjour or another zero configuration network protocol.

5. The method of claim 1, wherein the metadata includes privacy information indicating that a subset of the visual media content is unavailable for presentation.

6. The method of claim 1, further comprising deleting the retrieved one or more visual media content items upon detecting that the portable electronic device has changed status.

7. The method of claim 1 wherein the metadata includes security credentials needed to retrieve the visual media content.

8. The method of claim 1 wherein the metadata includes information that specifies presentation parameters for the visual media content.

9. The method of claim 8 wherein the presentation parameters include one or more of presentation format information and complementary media to be presented along with the retrieved visual media content.

10. A method performed by one or more processes executing on a host computer system, the method comprising:
    detecting that a plurality of portable electronic devices are within a predefined communications proximity relative to the host computer system;
    establishing wireless communications with the portable electronic devices;
    receiving metadata from the portable electronic device, wherein the metadata relates to one or more items of visual media content resides on one or more of the portable electronic devices, wherein the metadata includes a low resolution version of a visual media content item that is available for display while the host computer system is retrieving a high resolution counterpart of the visual media item;
    using the metadata in the one or more portable electronic devices to generate a collective library of visual media content currently available; and
    presenting the visual media content in the collective library on a presentation device that is separate from the plurality of portable electronic devices and is associated with the host computer system.

11. The method of claim 10 further comprising modifying the collective library of visual media content upon detecting that one or more of the portable electronic devices has changed state.

12. The method of claim 1, wherein the storage location separate from the portable electronic device includes a server computer system that stores an item of visual media content, wherein the metadata includes a Uniform Resource Locator (URL) that references the item of visual media content stored on the server computer system, and wherein using the metadata to retrieve the item of visual media content from the storage location separate from the portable electronic device comprises using the URL to access the server computer system to retrieve the item of visual media content from the server computer system.

13. A non-transitory computer storage medium storing instructions that when executed by data processing apparatus cause the data processing apparatus to perform operations comprising:
    detecting that a portable electronic device is within a predefined communications proximity relative to a host computer system;
    establishing wireless communications with the portable electronic device;
    receiving information from the portable electronic device sufficient to determine that metadata that relates to one or more items of visual media content resides on the portable electronic device;
    retrieving one or more high resolution counterparts of the one or more items of visual media content that resides on the portable electronic device from a storage location separate from the portable electronic device; and
    adding the retrieved one or more high resolution counterparts to a list of visual media content available for presentation on a presentation device associated with the host computer system.

14. The medium of claim 13, wherein the visual media content comprises digital still images, digital video, or a combination of both.

15. The medium of claim 13, further comprising deleting the retrieved one or more high resolution counterparts upon detecting that the portable electronic device has departed from the predefined communications proximity.

16. The medium of claim 13, wherein establishing wireless communications comprises using Bonjour or another zero configuration network protocol.

17. The medium of claim 13, wherein the metadata includes privacy information indicating that a subset of the visual media content is unavailable for presentation.

18. The medium of claim 13, further comprising deleting the retrieved one or more high resolution counterparts upon detecting that the portable electronic device has changed status.

19. The medium of claim 13 wherein the metadata includes security credentials needed to retrieve the visual media content.

20. The medium of claim 13 wherein the metadata includes information that specifies presentation parameters for the visual media content.

21. The medium of claim 20 wherein the presentation parameters include one or more of presentation format information and complementary media to be presented along with the retrieved visual media content.

22. The medium of claim 13, wherein the storage location separate from the portable electronic device includes a server computer system that stores a high resolution counterpart of an item of visual media content that resides on the portable electronic device, wherein the metadata includes a Uniform Resource Locator (URL) that references the high resolution counterpart stored on the server computer system, and wherein retrieving the high resolution counterpart from the storage location separate from the portable electronic device comprises using the URL to access the server computer system to retrieve the high resolution counterpart from the server computer system.

23. A system comprising:
    data processing apparatus; and
    a computer-readable medium storing instructions executable by the data processing apparatus to perform operations comprising:

detecting that a portable electronic device is within a predefined communications proximity relative to a host computer system;

establishing wireless communications with the portable electronic device;

receiving information from the portable electronic device sufficient to determine that metadata that relates to one or more items of visual media content resides on the portable electronic device;

retrieving one or more high resolution counterparts of the one or more items of visual media content that resides on the portable electronic device from a storage location separate from the portable electronic device; and adding the retrieved one or more high resolution counterparts to a list of visual media content available for presentation on a presentation device associated with the host computer system.

24. The system of claim 23, wherein the visual media content comprises digital still images, digital video, or a combination of both.

25. The system of 23, the operations further comprising deleting the retrieved one or more items of high resolution visual media content upon detecting that the portable electronic device has departed from the predefined communications proximity.

26. The system of claim 23, the operations further comprising deleting the retrieved one or more items of high resolution visual media content upon detecting that the portable electronic device has changed status.

27. The system of claim 23, wherein the metadata includes information that specifies presentation parameters for the visual media content.

28. The system of claim 27, wherein the presentation parameters include one or more of presentation format information and complementary media to be presented along with the retrieved visual media content.

29. The system of claim 23, wherein the storage location separate from the portable electronic device includes a server computer system that stores a high resolution counterpart of an item of visual media content that resides on the portable electronic device, wherein the metadata includes a Uniform Resource Locator (URL) that references the high resolution counterpart stored on the server computer system, and wherein retrieving the high resolution counterpart from the storage location separate from the portable electronic device comprises using the URL to access the server computer system to retrieve the high resolution counterpart from the server computer system.

* * * * *

UNITED STATES PATENT AND TRADEMARK OFFICE
CERTIFICATE OF CORRECTION

PATENT NO. : 8,677,502 B2  Page 1 of 1
APPLICATION NO. : 12/710268
DATED : March 18, 2014
INVENTOR(S) : Eric Hanson et al.

It is certified that error appears in the above-identified patent and that said Letters Patent is hereby corrected as shown below:

In the Claims:

In Column 21, In Line 21, In Claim 25, delete "of" and insert -- of claim --, therefor.

Signed and Sealed this
Seventeenth Day of June, 2014

Michelle K. Lee
*Deputy Director of the United States Patent and Trademark Office*